United States Patent

Ramesh et al.

[11] Patent Number: 5,478,477
[45] Date of Patent: Dec. 26, 1995

[54] USE OF ALGINATES TO TREAT BAUXITE RED MUD

[75] Inventors: Manian Ramesh, Naperville, Ill.; John D. Kildea, Mandurah WA, Australia; Robert P. Mahoney, Warrenville, Ill.

[73] Assignee: Nalco Chemical Company, Naperville, Ill.

[21] Appl. No.: 334,307

[22] Filed: Nov. 4, 1994

[51] Int. Cl.⁶ .................................................. B01D 21/01
[52] U.S. Cl. .................... 210/728; 210/730; 210/733; 423/121; 423/122; 209/5
[58] Field of Search ..................... 209/5; 210/725, 210/727, 728, 730, 733, 734; 423/111, 121, 122, 130

[56] References Cited

U.S. PATENT DOCUMENTS

| Re. 28,474 | 7/1974 | Anderson et al. | 260/29.64 |
|---|---|---|---|
| 3,085,853 | 4/1963 | Lesinski et al. | |
| 3,284,393 | 11/1966 | Vanderhoff et al. | |
| 3,338,828 | 8/1967 | Clark | 210/730 |
| 3,350,304 | 10/1967 | Bacon | 210/730 |
| 3,397,953 | 8/1968 | Gavin et al. | |
| 3,445,187 | 5/1969 | Sibert | |
| 3,541,009 | 11/1970 | Arendt | |
| 3,681,012 | 8/1972 | Sibert | |
| 4,565,635 | 1/1986 | LeDu et al. | 210/730 |
| 4,604,431 | 8/1986 | Fong et al. | 525/351 |
| 4,678,840 | 7/1987 | Fong et al. | |
| 4,680,339 | 7/1987 | Fong et al. | |
| 4,762,894 | 8/1988 | Fong et al. | |
| 4,767,540 | 8/1988 | Spitzer et al. | 210/728 |
| 5,008,089 | 4/1991 | Moody et al. | 423/121 |
| 5,217,620 | 6/1993 | Mahoney et al. | 210/728 |
| 5,387,405 | 2/1995 | Connelly et al. | 210/730 |

*Primary Examiner*—Peter A. Hruskoci
*Attorney, Agent, or Firm*—Robert A. Miller; James J. Drake

[57] ABSTRACT

Alginic acid is used in combination with high molecular weight synthetic water soluble polymers to flocculate red mud from Bayer process liquors. Superior clarity of supernatant liquor is achieved using the process of the invention.

6 Claims, No Drawings

USE OF ALGINATES TO TREAT BAUXITE RED MUD

TECHNICAL FIELD OF THE INVENTION

The present invention is in the technical field of clarification of red mud-containing liquors, particularly the primary settler liquor, generated in the Bayer process for the recovery of alumina from bauxite ore.

BACKGROUND OF THE INVENTION

In the Bayer process for the production of alumina, bauxite ore is pulverized, slurried in water, and then digested with caustic at elevated temperatures and pressures. The caustic solution dissolves oxides of aluminum, forming an aqueous sodium aluminate solution. The caustic-insoluble constituents of bauxite ore (referred to as "red mud") are then separated from the aqueous phase containing the dissolved sodium aluminate. Solid alumina trihydrate product is precipitated out of the solution and collected as product.

In more detail, the pulverized bauxite ore is fed to a slurry mixer where a water slurry is prepared. The slurry makeup water is typically spent liquor (described below) and added caustic. This bauxite ore slurry is then diluted and passed through a digester or a series of digesters where about 98% of the total available alumina is released from the ore as caustic-soluble sodium aluminate. The digested slurry is then cooled to about 230° F., typically employing a series of flash tanks wherein heat and condensate are recovered. The aluminate liquor leaving the flashing operation contains from about 1 to about 20 weight percent solids, which solids consist of the insoluble residue that remains after, or is precipitated during, digestion. The coarser solid particles may be removed from the aluminate liquor with a "sand trap" cyclone. The finer solid particles are generally separated from the liquor first by settling and then by filtration, if necessary. The slurry of aluminate liquor and the finer solids is normally first fed to the center well of a mud settler, or primary settler, where it is treated with a flocculant, and as the mud settles, clarified sodium aluminate solution, referred to as "green" or "pregnant" liquor, overflows a weir at the top. This overflow from the mud settling tank is passed to the subsequent process steps. If the aluminate liquor overflowing the settler contains an unacceptable concentration of suspended solids (at times from about 50 to about 500 mg of suspended solids per liter), it is then generally further clarified by filtration to give a flitrate with no more than about 10 mg suspended solids per liter of liquor. The treatment of the liquor collected after the primary settlement to remove any residual suspended solids before alumina trihydrate is recovered is referred to as a secondary clarification stage.

The clarified sodium aluminate liquor is seeded with alumina trihydrate crystals to induce precipitation of alumina in the form of alumina trihydrate, $Al(OH)_3$. The alumina trihydrate particles or crystals are then separated from the concentrated caustic liquor, and the remaining liquid phase, the spent liquor, is returned to the initial digestion step and employed as a digestant after reconstitution with caustic.

In another section of the Bayer circuit, the settled solids of the primary settler ("red mud") are withdrawn from the bottom of the settler and passed through a countercurrent washing circuit for recovery of sodium aluminate and soda. As noted above, the red mud does not include any coarser particles removed prior to feeding the slurry to the primary or mud settler.

The at least partial separation of the red mud solids from the pregnant liquor at elevated temperatures by settling or by filtration is expedited by the use of a flocculant. This initial clarification of the pregnant liquor is referred to as the primary settler stage. Flocculating agents improve the separation of insolubles by increasing the rate at which the solids settle, by reducing the amount of residual solids suspended in the liquor, and by decreasing the amount of liquor in the settled solids phase. Flocculation performance is highly important in the primary settlement stages. Red muds are comprised chiefly of iron oxides (at least about 50 weight percent of the red mud solids), together with silicon oxides, calcium oxides, sodium alumino-silicates, titanium oxides and other materials, and commonly represent from about 5 to about 50 weight percent of the material of the bauxite ore. Generally these muds are comprised of very fine particles, which hinder the desired rapid and clean separation of red mud particles from the solubilized alumina liquor. If the rate of separation is slow, output is materially diminished and overall process efficiency is impaired. If the separation is not clean, the resultant solubilized aluminate liquor will require a more extensive treatment to remove residual solids, and/or the trihydrate recovered will contain levels of impurities that are undesirably high for many end-users.

The polysaccharides starch and dextran were used early in red mud flocculation. For instance, U.S. Pat. No. 3,085,853, Apr. 16, 1963, Lesinski et al., uses native dextrans to increase the rate of sedimentation of finely divided solids in aqueous suspensions and thereby facilitate the separation of such solids. Later synthetic polymeric flocculants became more commonly employed for the Bayer process. U.S. Patent No. 3,397,953, Aug. 20, 1968, Galvin et al., uses a blend of starch and polyacrylic acid on red mud suspensions, noting that polyacrylic acid alone is not suitable as a flocculating agent. The polyacrylic acids exemplified generally have molecular weights of less than 300,000. The flocculation and sedimentation activity of the blend is exemplified in the primary settler stage of a bauxite process. U.S. Pat. No. 3,445,187, May 20, 1969, Sibert, uses synthetic acrylic acid polymer alone to enhance the rate of separation of red mud solids from the aqueous caustic solutions during secondary clarification steps. The synthetic polymer used contains at least about 80 weight percent of the acrylic acid mer unit, and has a molecular weight in excess of 50,000 and preferably in excess of 100,000. U.S. Pat. No. 3,541,009, Nov. 17, 1970, Arendt et al., uses a combination of causticized or modified starch, a water soluble polymer, and a caustic alkali to enhance the coagulation, sedimentation and/or filtration of aqueous suspensions of solids, including the settling of red mud from Bayer process liquor. The water soluble polymer is derived from at least one olefinically unsaturated monomer and has a molecular weight in excess of 100,000. U.S. Pat. No. 3,681,012, Aug. 1, 1972, Sibert, uses an acrylic acid polymer most preferably having a molecular weight of at least 1,000,000, either alone or in combination with starch, for clarification of digested bauxite containing solubilized alumina and red mud residues. U.S. Pat. No. 4,767,540, Aug. 30, 1988, Spitzer et al., uses a polymer that contains hydroxamic acid groups. U.S. Pat. No. 5,008,089, Apr. 16, 1991, Moody et al., uses a combination of dextran and synthetic anionic polymer for flocculating red mud in Bayer process liquors. U.S. Pat. No. 5,217,620, which is hereinafter incorporated by reference into this specification, teaches the use of certain polysaccharide materials including pullulan, lactan, zooglan, rhamsan, or combinations thereof as clarification aids which are used in conjunction with high molecular weight polymer flocculants to flocculate Bayer process red muds.

The synthetic flocculating agents employed for the settling or filtration of red mud are generally high molecular weight water soluble polymers of one or more ethylenically unsaturated monomers, and have been used together, as noted above, with starch, dextran, pullulan, lactan, zooglan, and rhamsan for aluminate liquor clarification. The synthetic flocculating agents are usually anionic, and the optimum anionic content of such polymer is usually related to the alkalinity of the liquor. In the washing circuit, the early wash liquors have the highest alkalinity and may require a more highly anionic polymer than the later wash liquor.

It is an object of the present invention to provide a more effective flocculation for separating red mud from the red mud-containing liquors, particularly the primary settler liquor, of the Bayer process. It is an object of the present invention to provide a method whereby the suspended solids retained in the supernatant after flocculation of the red mud-containing liquors, particularly the primary settler liquor, of the Bayer process are diminished. It is an object of the present invention to provide a more effective Bayer process wherein flocculation for separating red mud from the red mud-containing liquors, particularly the primary settler liquor, is improved by a more complete flocculation of the solids. Such red mud-containing liquors include the liquors of the counter-current mud washers. These and other objects of the present invention are described in more detail below.

DISCLOSURE OF THE INVENTION

The present invention provides a method for improved flocculation of Bayer process red mud-containing liquors, particularly the primary settler liquors, using, in addition to a conventional flocculant, alginic acid, or alkali metal, preferably sodium, salt of alginic acid to reduce the suspended solids concentration of the supernatant liquor. The present invention also provides a more effective Bayer process wherein flocculation for separating red mud from the red mud-containing liquors, particularly the primary settler liquor, is improved by the addition of a alginic acid, or alkali metal salts of alginic acid together with a conventional flocculant so as to promote a more complete flocculation of the solids.

PREFERRED EMBODIMENTS OF THE INVENTION

The Bayer process liquors generally are aqueous media containing dissolved sodium aluminate and red mud solids at various concentrations. Such liquors include the primary settler slurry or feed, which contains high concentration levels of both red mud and dissolved sodium aluminate, the red mud washing slurries, which have high red mud concentrations but lesser concentrations of sodium aluminate and total alkalinity, and the secondary clarification liquors, which are rich in dissolved sodium aluminate but contain much less red mud than the other types of liquors. As discussed above, the separation of the red mud from the sodium aluminate and its aqueous phase is continued from the primary settlement stage until concentrated red mud is eliminated from the process circuit, and from the primary settlement stage until the clarified liquor is subjected to the alumina trihydrate crystallization.

The flocculation of red mud, which routinely precedes either settling or filtration, is most difficult in the primary settlement stage because of the high concentration of fine particles, and the high concentration of total alkalinity. Improvement of the flocculation effectiveness in the primary settlement stage is extremely important to the entire Bayer process. By reducing the level of suspended solids that remain in the supernatant above the floc formed in the primary settler liquor, the solids to be removed during secondary clarification stages are diminished.

In the Bayer process the bauxite ore is digested under highly alkaline conditions, and the typical primary settler liquors are routinely highly alkaline, containing sodium or calcium hydroxide, sodium aluminate, and commonly sodium carbonate. The total alkalinity of primary settler feed, that is the liquor charged to the primary settlement stage, is typically from about 100 to 300 grams per liter of settler feed, as sodium carbonate. The solids contents of typical primary settler feeds vary from about 15 or 20 grams per liter of settler feed to about 80 or 85 grams per liter of settler feed.

By primary settler feed is meant herein the Bayer process digested slurry as charged to the first solids/liquid separation stage. Such feed may be an admixture of the digested slurry plus dilution liquor, and the dilution liquor is routinely the counter current technique wash water from the red mud washing stages discussed above. The primary settler feed differs from the liquors or slurries subjected to clarification and/or separation in the secondary clarification stage or the red mud washing stages by composition as to the solids content, dissolved sodium aluminate content, and/or total alkalinity. The primary settler feed also differs from the liquors or slurries subjected to clarification and/or separation in the secondary clarification stage or the red mud washing stages in that no insoluble fraction thereof has received an earlier flocculation treatment. An improved clarification of Bayer process primary settler liquors is the principle object of the present invention. Nonetheless in broad embodiment the present invention is directed to the clarification of red mud-containing liquors, particularly the counter-current wash liquors in addition to the primary settler liquors of the Bayer process.

Upon flocculation of a primary settler feed, typically employing a synthetic polymeric flocculant, a clear liquor/mud interface will form, and will gradually settle, providing a clear liquor supernatant layer overlying a mud layer. The lower mud layer contains the flocculated material, and as discussed above is comprised of both red mud solids and some amount of pregnant liquor. The overlying supernatant is "mud-clear" and the interface between it and the mud layer is clearly seen in some cases, but the supernatant is not entirely free of suspended solids, appearing instead as a hazy, but transparent liquid. The present invention diminishes the amount of suspended solids in such supernatant, and hence decreases the extent of secondary clarification required to obtain a given purity of sodium aluminate solution.

The digested slurry is typically discharged from the flash tanks at elevated temperatures and the primary settler feed is generally not further cooled before charging to the primary settlement stage other than the cooling which may occur when a digested slurry is optionally admixed with the liquor from the first red mud wash stage to form the primary settler feed. The flocculation of the primary settler feed is thus routinely conducted at atmospheric pressures and at elevated temperatures of from about 80° or 90° C. to about 105° or 115° C.

In preferred embodiment, the polymeric flocculant and the alginic acid clarification aid are both added to the primary settler feed as aqueous solutions to facilitate rapid dispersion of each agent within the primary settler feed. An overly dilute solution of the polymeric flocculant or the alginic acid clarification aid will unnecessarily add water to the primary settler feed and generally unnecessarily dilute the supernatant. For most polymeric flocculants, an aqueous solution containing from about 0.01 to about 0.5 weight percent of polymer actives is generally reasonable. For the alginic acid clarification aid, an aqueous solution containing from about 0.01 to about 3.0 weight percent of alginic acid actives is generally reasonable. To further facilitate the dispersion of these agents in the primary settler feed, in preferred embodiment one or both are added as alkaline aqueous solutions, for instance having a pH of at least about 9, and more preferably at least about 10.

In preferred embodiment the polymeric flocculant and the alginic acid clarification aid are added sequentially, the polymeric flocculant being added ahead of the alginic acid clarification aid. In preferred embodiment the primary settler feed is subjected to mechanical agitation after both the addition of the polymeric flocculant and the alginic acid clarification aid. Mechanical agitation may be accomplished by flow of the slurry through the feed pipe, by feeding into the settler, or by turbulence in the feeding region, usually the center well, of the settler. In preferred embodiment, after the polymeric flocculant and the alginic acid clarification aid are added, the mud layer or bed is allowed to settle before the supernatant and mud layers are separated, and during such settling time mechanical agitation of the liquor is avoided.

The present invention does not, however, exclude variations from preferred embodiments. For instance, the polymeric flocculant and the alginic acid clarification aid may be added concomitantly, either as separate but simultaneous charges, or together as a blend, and in some instances the clarification aid may be added ahead of the flocculant, provided that such variations do not so diminish the performance of the present method that its employment is not commercially practical. The polymeric flocculant and/or the alginic acid clarification aid may be added as aqueous solutions having pH values of less than 9. The mechanical agitation of the primary settler feed either after the addition of the polymeric flocculant or after the addition of the alginic acid clarification aid may be omitted, again provided that such variations do not so diminish the performance of the present method that its employment is not commercially practical.

The above and other preferred embodiments are believed equally applicable to the clarification of counter-current red mud wash liquors.

THE HIGH MOLECULAR WEIGHT FLOCCULANTS

The polymeric flocculant employed in the process of the present invention is anionic, but it may have some nonionic or even cationic met units. The polymeric flocculant employed in the process of the present invention may be derived from ethylenically-unsaturated monomers, and if so the polymer met units will be comprised of two adjacent backbone carbons plus the substituents pendant therefrom. The polymer may be comprised of from about 0 to about 20 or 30 mole percent of nonionic mer units, such as (meth-)acrylamide mer units, which are nonionic, but polar, mer units, and from about 70 or 80 mole percent to about 100 mole percent of anionic mer units. The anionic met units may contain pendant carboxyl radicals, such as (meth-)acrylic acid, itaconic acid, maleic acid, crotonic acid and the like, and salts thereof with monovalent cations "monovalent" salts thereof), particularly sodium salts thereof, and preferably such anionic mer units are in a monovalent salt form. The anionic met units may be N-sulfoalkyl (meth-)acrylamide met units, which provide a pendant sulfonate radical. The anionic mer units may contain pendant hydroxamic acid groups or derivatives thereof. The polymeric flocculant may be substantially a homopolymer of (meth-)acrylic acid or monovalent salt(s) thereof, or substantially a homopolymer of N-sulfoalkyl (meth)acrylamide. In another embodiment, the flocculant may be a polymer comprised of up to about 20 or 30 mole percent of (meth-)acrylamide mer units, the remainder being N-sulfoalkyl (meth)acrylamide mer units or anionic acrylate mer units or combinations thereof. Likewise, the polymer may be modified to include hydroxamic acid groups as taught in U.S. Pat. No. 4,767,540 to Spitzer et al.

U.S. Pat. No. 4,678,840 (Fong et al.) issued Jul. 7, 1987, describes a method for preparation of acrylamide polymers having ionizable phosphonate groups, and the disclosures of this patent are incorporated herein by reference. Phosphonate-containing acrylamide polymers that meet the preferred molecular weight ranges may possibly be as active in the present process as other anionic acrylamide polymers described above.

In another embodiment, the polymeric flocculant may contain a minor amount of cationic met units, preferably of the quaternary ammonium salt type, such as the quaternized salts of mer units of N-alkylsubstituted aminoalkyl esters of acrylic acid and others, including, for example:

1. the quaternized salts of reaction products of a polyamine and an acrylate type compound prepared, for example, from methyl acrylate and ethylenediamine;
2. (methacryloyloxyethyl)trimethyl ammonium chloride;
3. diallylmethyl(beta-propionamido)ammonium chloride, (beta-methacryloyloxyethyl) trimethylammonium methyl sulfate, and the like;
4. quaternized vinyllactam;
5. the quaternized salt of vinylbenzyltrial kylamines;
6. quaternized salt of vinyl-heterocyclic monomers having a ring nitrogen, such as (1,2-dimethyl- 5-vinylpyridinium methyl sulfate), (2-vinyl-2-imidazolinium chloride) and the like;
7. dialkyldiallylammonium salt including diallyldimethyl ammonium chloride ("DADMAC"); and
8. methacrylamidopropyltrimethylammonium chloride ("MAPTAC").

In any embodiment in which the polymeric flocculant contains cationic mer units, such amphoteric polymer should remain highly anionic in nature, and the cationic met units should not exceed about 5 or 10 mole percent of the polymer.

Non-interfering mer units other than (meth)acrylamide may be used, such as methylol acrylamide or other nonionic but polar mer units, and even nonpolar met units may be used to the extent that the presence of such mer units does not interfere with the water solubility of the polymeric flocculant. The polymeric flocculant generally should have a weight average molecular weight of at least about 500,000, and preferably at least about 1,000,000, and even more preferably at least about 4,000,000, or 5,000,000. The polymeric flocculant has no standard molecular weight ceiling for the purposes of the present invention, and some flocculants having molecular weights of 15,000,000 or higher may be highly useful for the present invention so long as the polymer remains water soluble or substantially water dispersible. A particularly preferred high molecular weight water soluble anionically charged flocculant for use in this invention is polyacrylic acid in either its sodium or ammonium salt forms having a molecular weight greater than about 10,000,000.

The polymeric flocculant employed in the present invention should be water soluble. The water solubility characteristic preferably is defined in terms of fluidity of aqueous solutions of the polymer. By "water soluble" is meant herein, and generally, that an aqueous solution of the polymer, at the polymer actives concentration at which it is charged to the primary settler feed is reasonably fluid, and preferably has a viscosity of no more than about 5,000 to 20,000 cps Brookfield, at ambient room temperature (from about 23° to about 26° C.). Such water solubility characteristic generally does not create a molecular weight ceiling because even an acrylamide homopolymer, substantially free of any electrolytic groups, meets such a standard at the high molecular weights that can now be provided by conventional synthesis techniques, provided the polymer is substantially linear, and hence the highly anionic polymeric flocculants employed in the present invention will generally be even more water soluble at a given molecular weight.

Vinyl addition polymers comprised of anionic acrylate mer units and/or N-sulfoalkyl (meth)acrylamide mer units, optionally together with (meth)acrylamide mer units, may be directly synthesized from the corresponding monomers by known techniques, for instance using as the sulfonate-containing monomer the 2-acrylamido-2-methylpropane sulfonic acid, or the methacrylamide version thereof. N-sulfoalkyl (meth)acrylamide mer units can also be incorporated into an existing polymer by post-polymerization derivatization, for instance by one of the methods described in U.S. Pat. No. 4,762,894 (Fong et al.) issued Aug. 9, 1988, U.S. Patent No. 4,680,339 (Fong) issued Jul. 14, 1987, U.S. Pat. No. 4,795,789 (Fong et al.) issued Jan. 3, 1989, and U.S. Pat. No. 4,604,431 (Fong et al.) issued Aug. 5, 1986, the disclosures of all of which are hereby incorporated hereinto. The sulfonated mer units of such post-polymerization derivatized polymers are generally of the sulfonate N-alkyl substituted (meth)acrylamide type.

High molecular weight polymeric flocculants of the type described above are commonly synthesized and commercially supplied in the form of water-in-oil emulsions form. Water-in-oil emulsions of the high molecular weight anionically charged polymers useful in this invention are available commercially from a variety of sources. The water-in-oil emulsion form for these types of polymers is preferred because it permits the polymer to be prepared and shipped at reasonably high concentrations (and the polymer therein is readily dispersible in water upon inversion of such emulsion by known techniques, which is desirable for many use applications). Water-in-oil emulsions of vinyl addition polymers are well known and are described, for instance, in U.S. Pat. No. 3,284,393, Vanderhoff, and U.S. Pat. No. Re. 28,474, Anderson-Frisque, and the disclosures of these patents are incorporated herein by reference. The use of high molecular weight water soluble polymeric flocculants supplied in dry powder form is of course not excluded, and the preparation of a solution from dry powder eliminates the presence of the oil constituent present in the latex form.

The typical polymeric flocculant is substantially linear and substantially free of pendant hydrophobic radicals or hydrophobic polymer backbone segments, but the present invention does not exclude the use of polymers having some branching or cross-linking, or some hydrophobic moieties, provided the polymer retains its water solubility and flocculation activity. An amphoteric polymer, as noted above, also is not excluded for use in the present process.

The use of alginic acid has demonstrated surprisingly greater activity in reducing the suspended solids in the supernatant of a flocculated primary settler feed when used in conjunction with anionically charged high molecular weight water soluble flocculants, and it is believed that a comparable activity level would be seen when used to clarify mud wash liquors.

THE ALGINIC ACIDS

Alginic acid is a polysaccharide found in all brown seaweeds of the genus Phaeophyceae which grow on rocky shores or ocean areas that have clean, rocky bottoms. These seaweeds are commonly found along the shore where depths are less than about 125 feet, the maximum depth to which sunlight will penetrate. They have been seldom spotted at the high-tide line. Although algin was consumed by humans dating back to 600 B.C., it was first discovered by a British chemist, E. C. C. Stanford in 1880. In 1896 A. Krefting prepared a pure alginic acid. In 1929 Kelco Corporation began commercial production of alginates and introduced milk-soluble algin as an ice cream stabilizer in 1934. Only a few species of brown seaweeds are used for commercial production of algin. The principal source of the world's supply of algin is the giant kelp, *Macrocystis pyrifera*, found along the coasts of North and South America, New Zealand, Australia, and Africa. Other seaweeds used in algin manufacture include *Ascophyllum nodosum* and species of Lammaria and Ecklonia.

Alginic acid is a high molecular weight linear glycuronan comprising solely D-mannuronic acid (m) and L-guluronic acid (g). Different alginic acids occur based on their m to g ratio usually in the form of an alkali metal salt. Table 1 lists the composition of alginic acids extracted from various seaweeds. While the exact molecular weights of the various alginic acids tested herein has not been absolutely quantified, it is estimated that the materials tested have molecular weights ranging from as low as 10,000 to as high as 250,000. It appears that higher molecular weight alginic acid materials give higher performance in the practice of this invention.

TABLE 1

| Species | Mannuronic acid content (%) | Guluronic acid content (%) | Ratio of Mannuronic to Guluronic acid | Range of Mannuronic to Guluronic acid ratios |
|---|---|---|---|---|
| Macrocystis pyrifera | 61 | 39 | 1.56 | — |
| Ascophyllum nodosum | 65 | 35 | 1.85 | 1.40–1.95 |
| Laminaria digitata | 59 | 41 | 1.45 | 1.40–1.60 |
| Laminaria hyperborea (stipes) | 31 | 69 | 0.45 | 0.40–1.0 |
| Ecklonia cava and Eisenia bicyclis | 62 | 38 | 1.60 | — |

Pure alginates as well as their sodium salts dissolved in distilled water form smooth solutions with long-flow characteristics. The physical variables that affect the flow properties are temperature, shear rate, polymer size, concentration, and the presence of co-solvents. The chemical variables that are believed to effect alginate solutions are pH, the presence of sequestrants, monovalent salts, polyvalent cations, and quaternary ammonium compounds. Alginic acid as well as sodium alginate form a very thick solution at concentrations higher than 3 weight percent. The term alginic acid as used herein is mean to encompass all soluble forms of alginic acid including its alkali metal salts, especially sodium alginate.

THE PROCESS

The basic process of the invention comprises the steps of:

adding to a Bayer process liquor containing red mud an effective amount of a high molecular weight anionic water soluble flocculant and a suspended solids reducing concentration amount of a water soluble alginic acid clarification aid;

mixing said flocculant and alginic acid clarification aid with the Bayer process liquor;

allowing the red mud contained in the Bayer process liquor to settle; and then, separating the red mud from the Bayer process liquor.

In the process of this invention, the anionic flocculant is added to the red mud-containing liquor in an amount sufficient to flocculate the red mud. In preferred embodiment, the anionic flocculant is added to the red mud-containing liquor in an amount sufficient to form a red mud phase therein having a concentration of solids that is at least about 150 percent of the initial concentration of solids in the red mud-containing liquor upon standing under conventional conditions (time and degree of mechanical agitation employed in a given industrial process). In another preferred embodiment the anionic flocculant is added to the red mud-containing liquor in an amount of from about 0.5 to about 20 mg of flocculant actives per liter of red mud-containing liquor, and more preferably from about 2 to about 8 mg of flocculant actives per liter of red mud-containing liquor. In another preferred embodiment the anionic flocculant is added to the red mud-containing liquor in an amount of from about 0.0005 to about 0.03 weight percent of flocculant actives based on the solids of red mud-containing liquor. In these preferred embodiments, the red-mud containing liquor is preferably a settler feed liquor, but the present invention does not exclude the use of the present process on one or more of the counter-current mud wash liquors.

The clarification aid is added to the red mud-containing liquor in an amount sufficient to reduce the suspended solids in the supernatant. In preferred embodiment, the clarification aid is added to the red mud-containing liquor in an amount sufficient to form a supernatant therein having a concentration of solids that is at least about 20 percent less than the concentration of solids in the supernatant formed without the clarification aid, upon standing under conventional conditions (time and degree of mechanical agitation employed in a given industrial process). In the practice of this invention, there does not appear to be a true upper dosage limitation for the alginic acid of this invention. Increasing the dosage of alginic acid appears to continually improve performance. As such, the upper dosage limitations given herein are based on practicality and economics of the Bayer process. In a preferred embodiment the clarification aid is added to the red mud-containing liquor in an amount of from about 0.05 to about 100 mg of clarification aid actives per liter of red mud-containing liquor, and more preferably from about 0.1 to about 50 mg of clarification aid actives per liter of red mud-containing liquor and most preferably from about 0.15 to 10 mg/liter. In another preferred embodiment the clarification aid is added to the red mud-containing liquor in an amount of from about 0.0005 to about 0.1 weight percent of clarification aid actives based on the solids of red mud-containing liquor, and more preferably from about 0.0002 to about 0.03 weight percent of clarification aid actives based on the solids of red mud-containing liquor. In another preferred embodiment the clarification aid is added to the red mud-containing liquor in an amount of from about 5 to about 500 weight percent of clarification aid actives based the flocculant actives added, and more preferably from about 25 to about 150 weight percent of clarification aid actives based on the flocculant actives added. In these preferred embodiments, the red mud-containing liquor is preferably a settler feed liquor, but the present invention does not exclude the use of the present process on one or more of the counter-current mud wash liquors.

EXAMPLES

In order to illustrate the subject invention, the following tests were conducted.

Alginic acid materials were tested in conjunction with a commercially available high molecular weight water soluble ammonium polyacrylate flocculant designated Nalco® 9779 which is available from Nalco Chemical Company, Naperville, Ill. This product is in the form of a water-in-oil emulsion of ammonium polyacrylate which rapidly inverts into aqueous systems, causing the rapid solubilization of the polymer contained in the emulsion. The polymer contained in the emulsion is reported to have a molecular weight in excess of about 10,000,000.

The test methodology consisted of taking a fresh one liter sample of a red mud slurry at an actual alumina refinery, and treating with flocculant at approximately 100° C. and measuring settling rate. After settling, the mud compacted for a period of 45 minutes and the compaction volume is recorded. A sample of the supernatant phase (overflow) liquor is taken for determination of gravimetric suspended solids or turbidity measurement. The clarity of the overflow liquor is important for subsequent filtration, precipitation, and product clarity ratio (CR). Clarity value obtained in an optimized condition using flocculant alone is taken as unity and serves as a reference for that batch of testing. In each of the tests reported below, flocculant addition was optimized, and the so determined optimum amount of flocculant was used in each test.

Addition of alginates was done either prior to or after the introduction of the flocculant. In a typical testing, an aqueous solution of sodium alginate (0.1–1.0 weight percent) in 1 weight percent caustic was freshly prepared. To a fresh sample of Bayer liquor (1 L), kept at 100 ° C. in a graduated cylinder was added an appropriate quantity (1–10 ppm) of flocculant and the cylinder was then mixed with a plunger 4 times. Appropriate quantities of sodium alginate solution (5–50 ppm) were then added, and the cylinder was again mixed with a plunger for another 4 times. The settling rate was measured and recorded. The cylinder was kept aside at 100 ° C. for 45 minutes. An aliquot of supernatant was collected and its turbidity measured using a Hach turbidimeter. A clarity ratio was then calculated by dividing the alginate treatment turbidity by the standard flocculant treatment turbidity value. A successful treatment program will accordingly have a CR value of less than 1.0.

Example 1

Alginic acid obtained from Aldrich Chemical Co. was tested at three alumina refineries, designated herein as refineries X, Y, and Z respectively in the U.S. using the procedure outlined above. Red mud slurries were obtained from commercial production. Results are shown in Table II below:

TABLE II

| Refinery | CR (at 10 mg/L) | CR (at 30 mg/L) | CR (at 50 mg/L) | CR (at 60 mg/L) |
|---|---|---|---|---|
| X | 0.68–0.88 | — | — | — |
| Y | 0.86–0.91 | 0.80–0.81 | 0.75 | — |
| Z | 0.71 | — | — | 0.6–0.7 |

Table III shows that the performance of alginic acid is better a refinery X and Z than at refinery Y where about 5 times the dose is required to reach a 25% clarity improvement. Each refinery utilizes a different blend of bauxite and different digestion conditions which may influence the behavior of the red mud slurries.

Example 2

Industrial grade alginates from Kelco (San Diego, Calif.), and Kimitsu (Tokyo, Japan) were tested for clarification activity at the same refineries at which testing was conducted in Table II. Results are shown in Table III, below:

TABLE III

| Refinery | Kelco Keltex Alginate | | Kimitsu Fujifloc (M) | |
|---|---|---|---|---|
| | CR (at 10 mg/L) | CR (at 30 mg/L) | CR (at 10 mg/L) | CR (at 30 mg/L) |
| X | 0.53 | — | 0.61 | — |
| Y | 0.97 | 0.99 | 0.52–0.68 | 0.49 |
| Z | 0.76 | — | — | — |

Example 3

Several other commercially available alginates were tested in direct comparisons at refineries X and Y to rank their performance at 10 mg/L active dosages. Results are shown in Table IV below:

TABLE IV

| Alginate Product | CR at Refinery Y | CR at Refinery X |
|---|---|---|
| Aldrich Alginic Acid | 0.86 | 0.68 |
| Kelco Keltex | 0.97 | 0.53 |
| Kimitsu Fujifloc (M) | 0.68 | 0.61 |
| Kelco Keltone LV | — | 0.59 |
| Kelco Kelgin LV | — | 0.61 |
| Kelco Kelgin MV | — | 0.52 |
| Kelco Kelgin HV | — | 0.59 |

Results show that the alginic acid and sodium alginate of the subject invention, when used in combination with high molecular weight anionic flocculant materials provides to the art a superior method for obtaining red mud flocculation, and overflow clarity. In addition to the use of the sodium alginate and alginic acid materials of the subject invention in red mud primary settlers, the material may also be employed in the washing of red mud to remove residual caustic values, and in secondary or tertiary red mud settlers.

Having thus described our invention, we claim:

1. A process for separating Bayer process red mud from a Bayer process liquor which comprises the steps of:
   adding to a Bayer process liquor containing red mud an effective amount of a high molecular weight anionic water soluble flocculant having a molecular weight of at least 10,000,000 and selected from the group consisting of alkali metal and ammonium polyacrylates, and a suspended solids reducing concentration amount of a water soluble alginic acid clarification aid having a molecular weight of about 10,000 to about 250,000;
   mixing said flocculant and alginic acid clarification aid with the Bayer process liquor;
   allowing the red mud contained in the Bayer process liquor to settle; and then,
   separating the red mud from the Bayer process liquor.

2. The process of claim 1 wherein the clarification aid is sodium alginate.

3. The process of claim 2 wherein the high molecular weight anionic flocculant and the water soluble clarification aid are added to a primary settler feed.

4. The process of claim 1 wherein from about 0.05 to 100 mg of alginic acid clarification aid is added per liter of Bayer process liquor.

5. The process of claim 1 wherein from about 0.1 to 50 mg of alginic acid clarification aid is added per liter of Bayer process liquor.

6. The process of claim 1 wherein from about 0.15 to 20 mg of alginic acid clarification aid is added per liter of Bayer process liquor.

* * * * *